(12) United States Patent
Bösmann et al.

(10) Patent No.: US 10,396,388 B2
(45) Date of Patent: Aug. 27, 2019

(54) SYSTEM AND METHOD FOR STORING AND RELEASING ENERGY

(71) Applicant: HYDROGENIOUS TECHNOLOGIES GMBH, Erlangen (DE)

(72) Inventors: Andreas Bösmann, Hessdorf (DE); Patrick Preuster, Heideck (DE); Matthias Schmidt, Erlangen (DE); Daniel Teichmann, Nürnberg (DE); Peter Wasserscheid, Erlangen (DE); Wolfgang Arlt, Nürnberg (DE)

(73) Assignee: HYDROGENIOUS TECHNOLOGIES GMBH, Erlangen (DE)

( * ) Notice: Subject to any disclaimer, the term of this patent is extended or adjusted under 35 U.S.C. 154(b) by 323 days.

(21) Appl. No.: 15/037,497

(22) PCT Filed: Nov. 19, 2014

(86) PCT No.: PCT/EP2014/074961
§ 371 (c)(1),
(2) Date: May 18, 2016

(87) PCT Pub. No.: WO2015/075044
PCT Pub. Date: May 28, 2015

(65) Prior Publication Data
US 2016/0301093 A1    Oct. 13, 2016

(30) Foreign Application Priority Data
Nov. 19, 2013   (DE) .................. 10 2013 223 589

(51) Int. Cl.
*C01B 3/00* (2006.01)
*C25B 1/04* (2006.01)
(Continued)

(52) U.S. Cl.
CPC ............ *H01M 8/186* (2013.01); *C25B 1/04* (2013.01); *C25B 15/08* (2013.01);
(Continued)

(58) Field of Classification Search
None
See application file for complete search history.

(56) References Cited

U.S. PATENT DOCUMENTS 7,429,379 B2    9/2008  Wallach et al.
2006/0222912 A1*  10/2006  Smith .................. C25B 9/18
                                                    429/418
(Continued)

FOREIGN PATENT DOCUMENTS

DE    10 2011 116694 A1    4/2013
DE    102011116694 A1 *    4/2013  ............. C25B 15/02
(Continued)

OTHER PUBLICATIONS

International Search Report dated Jan. 19, 2015.
(Continued)

*Primary Examiner* — Daniel S Gatewood
(74) *Attorney, Agent, or Firm* — McGlew and Tuttle, P.C.

(57) ABSTRACT

A system for storing energy includes a hydrogen production unit for producing hydrogen, a hydrogen storage device for storing hydrogen, with a loading unit for loading a carrier medium with the hydrogen produced in the hydrogen production unit and with an unloading unit for unloading the hydrogen from the loaded carrier medium, a heat generation unit for generating heat and a heat storage unit for storing the heat generated by the heat generation unit, with the heat storage unit connected with the unloading unit in order to supply heat.

16 Claims, 3 Drawing Sheets

(51) Int. Cl.
   *H01M 8/18*      (2006.01)
   *C25B 15/08*     (2006.01)
   *H01M 8/0656*    (2016.01)
   *H01M 8/04007*   (2016.01)
   *H01M 8/04082*   (2016.01)

(52) U.S. Cl.
   CPC ... *H01M 8/04052* (2013.01); *H01M 8/04201* (2013.01); *H01M 8/0656* (2013.01); *C01B 3/0005* (2013.01); *H01M 2250/10* (2013.01); *Y02B 90/14* (2013.01); *Y02E 60/324* (2013.01); *Y02E 60/366* (2013.01); *Y02E 60/528* (2013.01); *Y02P 20/133* (2015.11)

(56) References Cited

U.S. PATENT DOCUMENTS

2007/0227899 A1  10/2007  McClaine et al.
2014/0302412 A1  10/2014  Arlt et al.

FOREIGN PATENT DOCUMENTS

DE   10 2011 121704 A1   6/2013
DE   10 2012 005 023 A1   9/2013
EP        1 475 349 A2   11/2004

OTHER PUBLICATIONS

Benjamin Muller et al, "Energiespeicherung mittels Methan und energietragenden Stoffen—ein thermodynamischer Vergleich", Chemie Ingenieur Technik, vol. 83, No. 11, Oct. 11, 2011, pp. 2002-2013, XP055161833, ISSN: 0009-286X, DOI: 10.1002/cite.201100113.

Daniel Teichmann et al, "Liquid Organic Hydrogen Carriers as an efficient vector for the transport and storage of renewable energy", International Journal of Hydrogen Energy, vol. 37, No. 23, Sep. 27, 2012, pp. 18118-18132, XP055097540, ISSN: 0360-3199, DOI: 10.1016/j.ijhydene.2012.08.066.

Daniel Teichmann et al, "Energy storage in residential and commercial buildings via Liquid Organic Hydrogen Carriers (LOHC)", Energy & Environmental Science, vol. 5, No. 10, Aug. 8, 2012, p. 9044, XP055097541, ISSN: 1754-5692, DOI: 10.1039/c2ee22070a.

\* cited by examiner

SYSTEM AND METHOD FOR STORING AND RELEASING ENERGY

CROSS REFERENCE TO RELATED APPLICATIONS

This application is a United States National Phase application of International Application PCT/EP2014/074961 filed Nov. 19, 2014 and claims the benefit of priority under 35 U.S.C. § 119 of German Patent Application 10 2013 223 589.5 filed Nov. 19, 2013, the entire contents of which are incorporated herein by reference.

FIELD OF THE INVENTION

The invention relates to a system and a method for storing and releasing energy.

BACKGROUND OF THE INVENTION

Power generation units are known in the state of the art that generate electric power from renewable energy sources. Especially used for this are photovoltaic systems, wind farms and/or hydroelectric power stations. The availability of renewable energy depends on meteorological influences and is in particular not controllable and difficult to predict. The generation of electric power from renewable energy is erratic.

SUMMARY OF THE INVENTION

An object of this invention is to improve the availability of electric power that has been generated in particular from renewable energy sources.

The object is fulfilled by a system for storing energy comprising a hydrogen production unit for producing hydrogen, a hydrogen storage device for storing hydrogen, comprising a loading unit for loading a carrier medium with the hydrogen produced in the hydrogen production unit and an unloading unit for unloading the hydrogen from the loaded carrier medium, a heat generation unit for generating heat and a heat storage unit for storing the heat generated by means of the heat generation unit, the heat storage unit is connected with the unloading unit in order to supply heat.

The object is further fulfilled by a system for releasing energy in the form of hydrogen comprising an unloading unit for unloading hydrogen from a loaded carrier medium and a heat generation unit for generating heat and a heat storage unit for storing the heat generated by means of the heat generation unit, wherein the heat storage unit is connected with the unloading unit in order to supply heat.

The object is further fulfilled by a method for storing energy comprising the process steps:
  Production of hydrogen by means of a hydrogen production unit,
  Loading a carrier medium by means of a loading unit with the hydrogen produced in the hydrogen production unit,
  Storing the load carrier medium by means of a carrier medium storage unit,
  Generation of heat by means of a heat generation unit,
  Storing heat generated by the heat generation unit by means of a heat storage unit,
  Unloading the hydrogen from the loaded carrier medium by means of an unloading unit,
  Supplying heat by means of the heat storage unit in the unloading unit, wherein the heat is required for unloading the hydrogen.

The object is further fulfilled by a method for releasing energy comprising the process steps:
  Generation of heat by means of a heat generation unit,
  Storing heat generated by the heat generation unit by means of a heat storage unit,
  Unloading the hydrogen from the loaded carrier medium by means of an unloading unit,
  Supplying heat by means of the heat storage unit in the unloading unit, wherein the heat is required for unloading the hydrogen.

The core of the invention resides in that a system for storing energy has a hydrogen storage device for storing hydrogen and a heat storage unit for storing heat. The hydrogen storage device allows hydrogen to be stored that has been produced in a hydrogen production unit. A loading unit is provided for loading an unloaded carrier medium with the hydrogen. The hydrogen can advantageously be handled in conjunction with the carrier medium, hence transported, conveyed, and in particular, stored. The advantageous handling of the hydrogen in conjunction with the carrier medium is enabled in particular in that the hydrogen is bound with the carrier medium and in particular, chemically bound. In particular, there is no need to handle molecular hydrogen. The handling of molecular hydrogen is complicated and represents a safety risk. A high equipment outlay is needed to allow safety-relevant handling of molecular hydrogen. The handling of molecular hydrogen is cost-intensive. The hydrogen is unloaded again from the loaded carrier medium with an unloading unit. The unloading process in the unloading unit allows the hydrogen to be released from the loaded carrier medium. Heat is required to trigger and/or to sustain the release. The heat storage unit is therefore connected, in particular directly and immediately, to the unloading unit. The heat required to unload the hydrogen can be supplied without complication, and with reduced loss, in particular without loss. In particular, it is not necessary for hydrogen stored in the hydrogen storage device to be used to apply the heat required for unloading the hydrogen. For example, when the released hydrogen, in particular, in a polymer electrolyte membrane fuel cell is energetically utilized, the heat thereby created has a temperature level that is too low to enable a release of the hydrogen from the hydrogen storage device. On the other hand, in the case of energetic utilization of released hydrogen in a combustion chamber, efficiency losses can result from the fact that the offtake of heat at a high temperature level causes efficiency losses inside the combustion chamber. Surprisingly, it was now found that, with the additional heat storage unit, the heat required to release the hydrogen can be supplied, in particular at the required time and in particular at the required temperature level. The power-to-power efficiency of the system is thereby improved. The heat, at least partially stored in the heat storage unit, is produced by means of a heat generation unit. The heat generation unit is a separate unit and in particular is designed to be separate from the hydrogen production unit, the hydrogen storage device and/or the heat storage unit. The heat generation unit is an additional unit of the system. The heat generation unit allows heat to be produced during an energy-rich period. Energy-rich means that more energy, in particular electric power generated from renewable energy sources, is available than is used. This means that there is an energy surplus. The surplus energy can be stored as hydrogen in the system, using the carrier medium. Energy-rich can also mean that low-cost energy is available. On the other hand, an energy-poor period is characterized in that energy is only available in insufficient quantities or at high costs. During the energy-poor period, heat from the heat storage unit is supplied for unloading in the unloading unit. In particular, heat is produced in the heat generation unit during the energy-rich period, and is stored in the heat storage unit. During the energy-poor period, the energy stored in the heat storage unit is delivered to the unloading unit. This means that more energy is required than is available. During the energy-poor period, a heat carrier is heated in the heat generation unit and the heated heat carrier is transferred to the heat storage unit. The heat storage unit is thereby transferred from a thermally unloaded to a thermally loaded state. In particular, the heat carrier is liquid or gaseous. It is also possible for the heat carrier to evaporate in the heat generation unit. For example, the heat carrier is an organic liquid heat-carrying oil, a molten salt, or a liquid metal. The heat carrier is heated in particular by using renewable energy sources and/or electric power.

It is possible in particular to enable hydrogen loading and storage using a first partial system at a first location and/or at a first, in particular energy-rich, time. This first partial system comprises in particular a hydrogen production unit for producing hydrogen and a loading unit for loading a carrier medium with the hydrogen produced in the hydrogen production unit. LOHC carrier media are used in particular, that can be advantageously handled, in particular stored and/or transported. A second partial system for releasing energy in the form of hydrogen comprises an unloading unit for unloading the hydrogen from the loaded carrier medium and a heating device for producing and storing heat, in which the heating device is connected to the unloading unit in order to supply heat. The second partial system is placed, in particular spatially distanced, therefore at a second location away from the first location. The release of hydrogen takes place in particular during a second, in particular, energy-poor period. The second partial system comprises in particular a hydrogen oxidation unit for streaming the released hydrogen to the second location. Electrical energy is provided at the second location. The second partial system can be installed and operated as a stand-alone system for releasing energy in the form of hydrogen, in particular independently of the first partial system. By reason of the good transport and storage properties of LOHC carrier media loaded with hydrogen, hydrogen, produced in the first partial system and chemically bound with the LOHC carrier medium, can be transported to the second partial system at the second location. Transport can take place in tanker vehicles and/or via a pipeline system provided for this. In particular, it is not necessary for a heating device to be provided in the first partial system. The second partial system, therefore the system for releasing energy in the form of hydrogen, can advantageously be operated by means of the heating device.

A system with a power generation unit for generating electric power is advantageous. The power generation unit is connected to the hydrogen production unit in order to supply power for hydrogen production and/or to the heat generation unit in order to supply power for heat generation. The power generation unit enables the supply of sufficient electric power for the hydrogen production unit. The power generation unit can be a separate local unit, which enables the generation of electric power in the system. It is also possible for a locally distant unit to be provided as a power generation unit, which is connected to the system, for example, via a power supply network. In particular, therefore, the power generation unit in the meaning of the Application must be understood to be a public power supply network. It was surprisingly found that even when the electric power generated by the power generation unit was used to produce both hydrogen and to generate heat, whereby the heat carrier is electrically heated, a power-to-power efficiency improvement of about 30% was obtained.

Particularly advantageous is a system in which the power generation unit enables the generation of electric power from renewable energy sources. In particular, the power generation unit is a photovoltaic unit, a wind farm and/or a hydroelectric power station.

It is particularly advantageous when the heat generation unit enables the carrier medium to be heated from renewable energy, i.e. from renewable heat, such as, for example, sunlight. In this case, a power-to-power efficiency improvement of up to 80% is obtained. Heating the heat carrier by direct solar radiation can be improved by bundling the solar radiation using a collector. In particular, the heat carrier can also be heated—at least partially—by electric heating, wherein the electric power required for this can be supplied by the power generation unit. The heat generation unit is capable of heating the heat carrier to a temperature range between 100° C. and 1,500° C., in particular between 150° C. und 1,200° C. and in particular between 200° C. und 800° C. The heat storage unit allows the heated heat carrier to be absorbed during the energy-rich period. The heat storage unit allows heat to be stored. The heat storage unit allows heat to be discharged through the emission of heat from the heated heat carrier during an energy-poor period in order to trigger or sustain the release of the hydrogen in the unloading unit. In a thermally loaded state, the heat storage unit allows, in particular through an additional heat exchanger, a heat flow to be generated in a temperature range between 50° C. and 1,000° C., in particular between 120° C. and 600° C. and in particular between 280° C. and 500° C. The release of the hydrogen in the unloading unit can, in particular, be preferably triggered or sustained in this temperature range. In particular, the heat storage unit is a thermally insulated tank system. The tank system can enable the storage of the organic liquid heat carrier oil, the hot molten salt or the liquid metal. It is also possible for the heat storage unit to be implemented as a latent heat storage system, which can absorb, store and re-emit heat through phase changes of the heat carrier. A solid material with a suitable heat capacity can also be used as a heat storage unit. Such a heat store is, for example, a concrete block or sand fill. In particular, the heat capacity of suitable solid materials is at least 0.4 kJ/(kg·K).

A thermo-chemical storage unit can also be used as a heat storage unit, in which heat is stored by releasing water and heat is released by absorbing water. A solid material with a high specific surface is provided in the storage unit, this material having a close chemical affinity for the accumulation of water molecules. Particularly preferred is such a heat storage unit with one or more porous oxidic solid materials, which can be modified in particular with inorganic salts. Particularly advantageous is a structural and/or constructive combination of the heat generation unit and the heat storage unit such that thermal loading, i.e. heating the heat carrier, can take place through direct solar radiation of the heat storage unit.

In particular, the heat storage unit is also designed and contained in the system for storing energy such that heat generated by the heat generation unit can be absorbed and, with a delay, at least partially discharged to the unloading unit.

Particularly advantageous is a system with a hydrogen oxidation unit for generating electric power. The electric power is enabled in particular by the oxidation of hydrogen with oxygen, while creating water. Electric power can be generated directly with the hydrogen oxidation unit, in particular when the hydrogen oxidation unit is a PEM fuel cell. Electric power is obtained from hydrogen and oxygen in the PEM fuel cell in a temperature range between −20° C. and 250° C., in particular between 20° C. and 180° C. As an alternative, a SOFC (Solid Oxide Fuel Cell) can also be used as a hydrogen oxidation unit. The generation of electric power is obtained from hydrogen and oxygen in the SOFC at a temperature between 200° C. and 1,200° C., in particular between 400° C. and 900° C. The hydrogen oxidation unit can also be used for the direct generation of electric power, for example when the hydrogen oxidation unit is a combustion chamber. Hot combustion gasses from the combustion chamber can be used to drive a turbine in order to generate electrical energy.

A system is advantageous in which the unloading unit for conveying unloaded carrier medium is connected to the loading unit such that unloaded carrier medium discharged from the unloading unit can be conveyed to the loading unit for loading with hydrogen. In particular, the hydrogen storage device has a closed circulation system for the carrier medium. In particular, a carrier medium temporary storage unit for storing the unloaded carrier medium can be provided between the unloading unit and the loading unit. In particular, a carrier medium storage unit for storing the loaded carrier medium can be provided between the loading unit and the unloading unit. The stored loaded carrier medium is an energy store. The loaded carrier medium can be released if required. The bound hydrogen is released and streamed into a hydrogen oxidation unit. The result is an improved buffer effect of the hydrogen storage device.

A system is advantageous in which the hydrogen production unit is an electrolyzer, which enables water to be decomposed as hydrogen and oxygen. The hydrogen created in the electrolyzer is delivered at least partially to the loading unit in order to load the carrier medium. The oxygen also created in the electrolyzer is discharged to an oxygen consumer placed in particular outside the system. It is also possible to emit the oxygen directly to the environment. Particularly preferred is the electrolyser designed as a high temperature electrolyzer or SOEC (Solid Oxide Electrolysis Cell). The SOEC is in particular directly connected to the heat storage unit. The heat storage unit is designed such that water vapor is released during thermal charging, therefore when supplying heated heat carrier. This water vapor is delivered directly to the SOEC. Water can therefore be supplied very efficiently for the SOEC. The water supplied for the SOEC has an improved purity, since the water is delivered to the SOEC in a gaseous state as water vapor. Desalination and therefore a systematic purification of the water is achieved through the evaporation step. During thermal unloading of the heat storage unit, the heat storage unit can absorb water vapour discharged in particular from the hydrogen oxidation unit. This means that the heat storage unit acts at the same time as a water storage unit. During an energy-poor period, water from the hydrogen oxidation unit is bound while heat is released. During an energy-rich period with heat absorption through thermal charging of the heat storage unit, this water is transformed to the vapor state and is supplied for electrolysis in the SOEC.

A system is advantageous in which the hydrogen in the loading unit is bound with the carrier medium. In particular, the hydrogen is chemically bound or bound by physisorption to the carrier medium. Chemical binding of the hydrogen can be obtained for example, in that the carrier medium present in the loading unit is a metal hydride store containing a material made of a metal alloy, which absorbs and chemically binds hydrogen.

As an alternative, the carrier medium can also be an organic liquid hydride. In this case, the chemical binding of the hydrogen in the loading unit takes place through catalytic hydrogenation of an organic molecule or of a mixture of organic molecules. Such organic hydrides, designated in English as liquid organic hydrogen carriers (LOHC) are known from EP 1 475 349 A2. This form of hydrogen storage has the particular advantage that LOHC carrier media come as liquids in the process conditions used. The physical/chemical properties of LOHC carrier media have a high similarity to conventional liquid fuels, such that pumps from the fuel and combustibles logistics domain can be used for transport and storage containers. Hydrogen storage in a chemically bound form in an organic liquid allows pressure-free storage in normal conditions over long periods without any significant water loss. LOHC carrier media are in particular polycyclic aromatic compounds with a π electron system or several π electron systems, which are transformed by hydrogenation to the relevant saturated polycyclic compounds in the loading unit of the hydrogen storage device. Dibenzyltoluene and benzyl toluene as pure substances, isomer mixtures or mixtures of these substances together can be used in particular as LOHC carrier media. It is also possible to use polycyclic, heteroaromatic compounds with a π electron system or several π electron systems as LOHC carrier media, which are transformed in the loading unit by hydrogenation to the relevant saturated polycyclic compounds containing heteroatoms such as nitrogen or oxygen. N-ethylcarbazole, N-propylcarbazole, N-isopropylcarbazole, N-butylcarbazole or mixtures of these substances together are used in particular as LOHC carrier media. Organic oligomers or polymers with extended π conjugated electron systems, which are transformed in the loading unit to the relevant saturated compounds, are possible LOHC carrier media. When using organic liquid hydrides, the at least partial hydrogenation of the unloaded LOHC carrier medium takes place in a pressure-stabilized chemical reactor as a loading unit at a temperature between 50° C. and 400° C., in particular between 120° C. and 300° C., in particular between 150° C. and 280° C. The hydrogenation, therefore the loading, takes place at a process pressure of 2 bar to 200 bar, in particular at 10 bar to 100 bar and in particular in the presence of a metalliferous catalyst. Particularly suitable catalysts for loading the LOHC carrier medium are those having the element ruthenium and/or nickel. Catalysts are also possible that have other elements or additional elements to ruthenium and/or nickel. Elements that store hydrogen and can be transferred to LOHC carrier media are essential. Metals in particular such as chromium, iron, cobalt, copper, iridium, palladium or platinum are possible catalysts in addition to ruthenium and/or nickel.

A system is advantageous in which the carrier medium storage unit is built into the loading unit. This is above all the case when the carrier medium is present as a solid material. As an alternative, the carrier medium storage unit has a separate, in particular external tank, which has in particular at least one tank pipe for connection to an external pipeline system. This is particularly advantageous when the carrier medium is present as a liquid or gas. It is thereby possible to keep the carrier medium largely pressure-free. For example, a container such as is known for storing liquid hydrocarbons such as fuels and/or heating oil can be used.

It is also conceivable that the carrier medium can be discharged in a pipeline system or transport system provided for this and supplied for unloading to another location.

At least a part of the heat from the heat storage unit is used in the unloading unit to release hydrogen. The released hydrogen is discharged to the hydrogen oxidation unit to generate electric power. If the carrier medium is a solid material, the unloading unit is designed such that hydrogen can be discharged and released from a material made of a specific metal alloy. If it is a sorptive carrier medium, the unloading unit enables desorption of hydrogen from a porous material in order to release hydrogen. If a LOHC carrier medium is used, the hydrogen is released from an organic molecule or from a mixture of organic molecules by a catalytic dehydrogenation reaction. This means that the release of the hydrogen takes place through a material transformation of the loaded carrier material due to unloading in the unloading unit by means of a catalytic dehydrogenation reaction. In the loaded state, the carrier medium is in particular a saturated polycyclic compound, in particular a perhydro-dibenzyltoluene or a perhydro-benzyltoluene, which can be used as pure substances, a mixture of isomers or mixtures of each other. As an alternative, the loaded carrier medium is a saturated polycylic compound containing heteroatoms such as nitrogen or oxygen, in particular perhydro-N-ethylcarbazole, perhydro-N-propylcarbazole, perhydro-N-isopropylcarbazole, perhydro-N-butylcarbazole or mixtures of these substances. As an alternative, a saturated organic oligomer or polymer, which can be transformed by catalytic dehydrogenation to oligomers or polymers with extended it conjugated electron systems can also be used as a loaded carrier medium. The loaded carrier medium is unloaded in the unloading unit in particular in a pressure-stabilized chemical reactor at a process temperature between 100° C. and 450° C., preferably between 150° C. and 420° C. and in particular between 180° C. and 390° C. The process pressure is between 0.1 and 30 bar, in particular between 1 and 10 bar, wherein a metalliferous catalyst can be used, containing in particular platinum and/or palladium. It is essential that the catalyst is capable of releasing hydrogen discharged from the LOHC carrier medium as hydrogen gas. In addition to platinum and/or palladium, metals such as chromium, iron, cobalt, nickel, copper, iridium or ruthenium in particular are suitable for this. The unloaded liquid carrier medium can be discharged from the unloading unit to a carrier medium temporary storage unit in particular, which can be placed outside the system. The unloaded, temporarily stored carrier medium can be used in particular at a later time for renewed loading with hydrogen, therefore for hydrogen storage in the system, in particular in the hydrogen storage device. A carrier medium storage unit can furthermore be provided for storing the loaded carrier medium. If a metal hydride store is used as the carrier medium, the installation space required for the loading unit, the carrier medium storage unit and the unloading unit is more compact. In particular, the three named units are structurally combined into a single component. Loading the solid carrier medium in the loading unit takes place at a lower temperature but at a higher pressure compared with unloading in the unloading unit.

A system is advantageous with a control unit, which has a bidirectional signal link with at least the heat storage unit and the unloading unit. It is therefore possible, with the control unit, to record the current state of the heat storage unit and of the unloading unit. This means that it is possible, via the control unit, to record how much heat is available in the heat storage unit. At the same time, it is possible to determine whether a heat requirement exists in the unloading unit. The control unit can directly control the supply of heat from the heat storage unit to the unloading unit, so that an unloading process is enabled or initiated in the unloading unit. The control unit can additionally bring about heat generation in the heat generation unit, provided that a predicted heat requirement in the unloading unit surpasses a heat supply in the heat storage unit. This ensures that an unloading process in the unloading unit can be performed consistently as a result of a sufficient supply of heat.

In order to supervise the entire process and/or the entire system for storing energy, a control unit with further components can be connected with the system, in particular with the power generation unit, the hydrogen production unit, the loading unit, carrier medium storage unit and/or hydrogen oxidation unit.

The method for storing energy according to the invention is characterized above all in that heat is supplied by means of the heat storage unit to the unloading unit, wherein the heat is needed for unloading a hydrogen storage unit and for releasing hydrogen from this hydrogen storage unit. The method furthermore comprises: producing hydrogen by means of a hydrogen production unit, loading a carrier medium with the hydrogen produced in the hydrogen production unit by means of a loading unit, storing the loaded carrier medium by means of a carrier medium storage unit, generating heat by means of a heat generation unit, storing heat generated by the heat generation unit by means of a heat storage unit and unloading the hydrogen from the loaded carrier medium by means of an unloading unit. The unloaded hydrogen is delivered in particular to a hydrogen oxidation unit for generating electric power. As an alternative, the hydrogen can be condensed and transferred to a hydrogen pressure tank, used at a later time and/or transported to another location in this stored form. In this bound form, the hydrogen stored on the loaded carrier medium can be made available, for example, at a hydrogen filling station. To do this, the hydrogen is released from the loaded carrier medium by delivering heat and is made ready for refueling.

A method is advantageous in which the generation of heat takes place during an energy-rich period, whereby energy, in particular in the form of electric power and/or of renewable energy, is used to generate the heat. The ability to generate heat in an energy-rich period is uncomplicated and affordable.

Particularly advantageous is the generation of heat for heating a liquid or gaseous heat carrier. The heated carrier medium in this form is particularly advantageously easy to handle.

Particularly advantageous is a method in which hydrogen unloading takes place during an energy-poor period, whereby heat that is needed for unloading the hydrogen can be made available as heat previously generated and temporarily stored. It is therefore in particular not necessary to generate heat separately at the energy-poor time. This results in efficiency and cost benefits.

Particularly advantageous is a method that enables the heat supply from the heat storage unit to the unloading unit to be controlled on the basis of a current thermal loading state of the heat storage unit and/or a current unloading state in the unloading unit.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
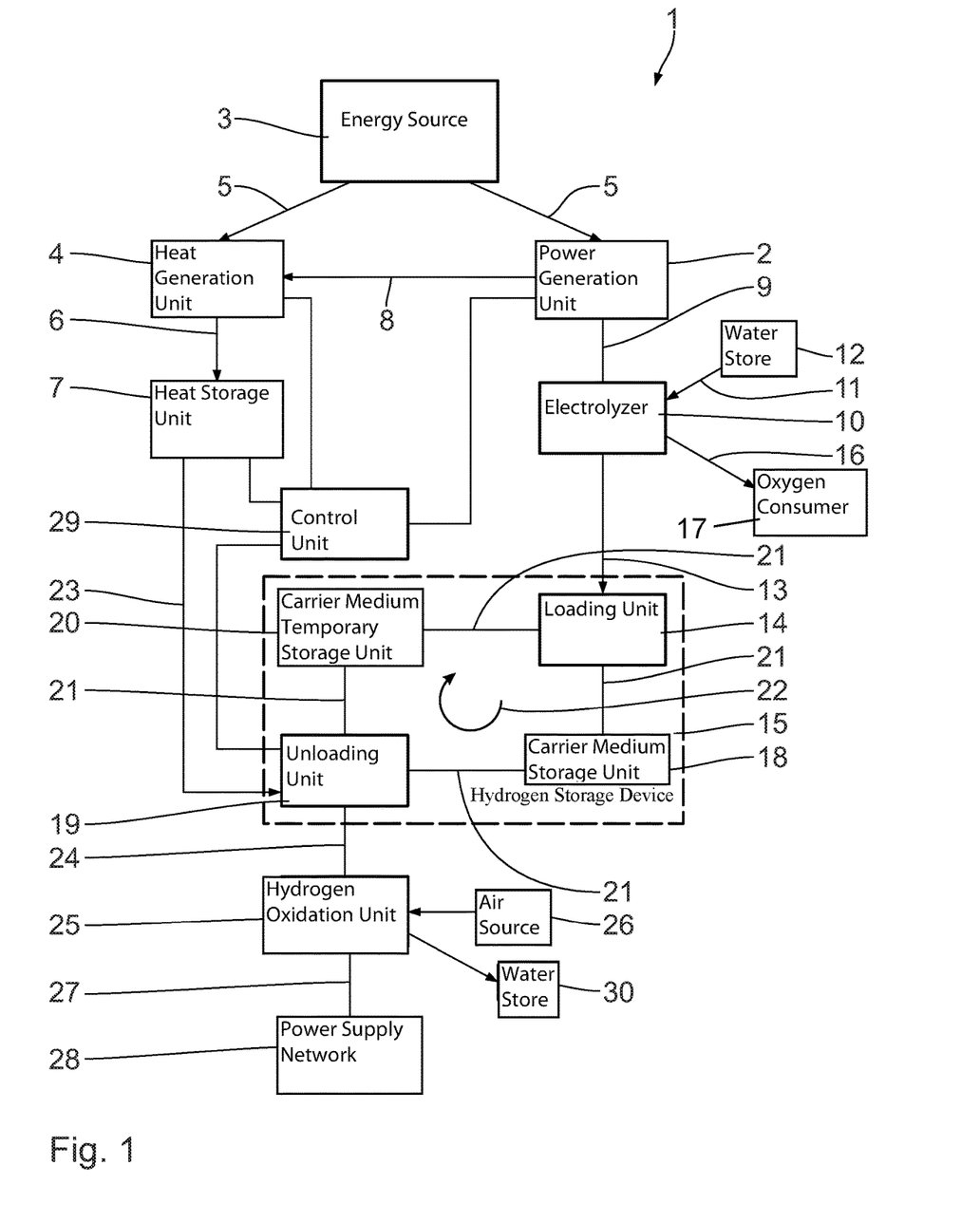
FIG. 1 is a schematic diagram of the system for storing energy according to the invention in accordance with a first embodiment example.

Referring to the drawings in particular, the system for storing energy schematically illustrated in FIG. 1 and designated 1 as a whole comprises a power generation unit 2 in the form of a photovoltaic system. Power generation unit 2 is capable of using energy supplied by renewable energy sources 3 to generate electric power. Energy sources 3 represent renewable, in particular, erratic energy forms. In addition to the photovoltaic unit, a wind farm and/or a hydroelectric power station come into question as power generation unit 2.

The direct energy effect from renewable energy source 3 on power generation unit 2 and a heat generation unit 4 is symbolically shown by an arrow 5. Heat generation unit 4 has a liquid heat carrier, which is heated by energy effect 5, in particular by direct solar radiation. Heat generation unit 4 is connected via a pipe 6 to a heat storage unit 7. Pipe 6 is capable of conveying the heat carrier. Pipe 6 is designed in particular as a so-called heat pipe. Such a heat pipe is a heat transmitter, in which a high heat flow density is made possible by using evaporation heat from the heat carrier. This means that with a smaller cross sectional area of pipe 6, large quantities of heat can be transported from heat generation unit 4 to heat storage unit 7. Effective and reduced loss heat transport is thereby possible.

The heat storage unit is designed in particular as a salt store, which can be heated, for example, to a temperature of about 500° C.

Power generation unit 2 is connected via a power cable 8 to heat generation unit 4. This makes it possible to deliver energy in the form of electric power from power generation unit 2 to heat generation unit 4.

A further power cable 9 is provided to connect power generation unit 2 to a hydrogen production unit 10. The hydrogen production unit is designed as an electrolyzer. Electrolyzer 10 is connected via a pipe 11 to a water store 12. Water store 12 can represent a storage container or a connection to a public water supply. Water from water store 12 can be delivered to hydrogen production unit 10 via pipe 11. Hydrogen, produced in gaseous form as $H_2$ in hydrogen production unit 10, can be delivered via a pipe 13 to a loading unit 14 of a hydrogen storage device 15. A pipe 16 is furthermore coupled to hydrogen production unit 10 for connection to an oxygen consumer 17. It is also possible not to provide oxygen consumer 17, and directly to emit oxygen into the environment through pipe 16.

Hydrogen storage device 15 is used to store hydrogen and comprises loading unit 14 for loading a carrier medium with the hydrogen that has been produced in hydrogen production unit 10. According to the embodiment example shown, a liquid carrier medium comprising the dibenzyltoluene/perhydro-dibenzyltoluene system as disclosed by Bruckner and Colleagues, ChemSusChem, 2013, DOI: 10.1002/cssc.201300426 serves as the carrier medium. Hydrogen storage device 15 further comprises a carrier medium storage unit 18 for storing the carrier medium loaded in the loading unit. Hydrogen storage device 15 further comprises an unloading unit 19 for unloading the hydrogen from the loaded carrier medium and a carrier medium temporary storage unit 20 for storing the unloaded carrier medium. Loading unit 14, carrier medium storage unit 18, unloading unit 19 and carrier medium temporary storage unit 20 are respectively connected together by pipes 21. In this case, these can be conventional pipes such as can also be used to convey diesel fuel or heating oil. The carrier medium can circulate through pipes 21 in a circulation direction 22 in the hydrogen storage device.

Unloading unit 19 is connected to heat storage unit 7 via a pipe 23. Heated heat carrier, therefore heat, can be transferred directly through pipe 23 from heat storage unit 7 to unloading unit 19. Unloading unit 19 is connected to a hydrogen oxidation unit 25 via a pipe 24. According to the shown embodiment example, the hydrogen oxidation unit is designed as a PEM fuel cell. Hydrogen oxidation unit 25 is connected to an oxygen source and/or to an air source 26. Hydrogen oxidation unit 25 is furthermore connected to a power supply network 28 via a power cable 27. A single power consumer can also be provided in place of power supply network 28. Power supply network 28 serves to supply several, in particular a plurality of up to 1,000 or 10,000 or more single power consumers. The power supply network can for example be a local power supply network, used to supply power to an industrial estate with one or more industrial companies and/or one or more private households. Power supply network 28 can also be part of the public power supply network. It is therefore possible for electric power that has been generated in hydrogen oxidation unit 25 to be delivered via power cable 27 and power supply network 28.

System 1 furthermore comprises a control unit for controlling the operation of system 1. Control unit 29 has in particular a birectional signal link respectively with heat storage unit 7 and unloading unit 19. It is therefore possible for the control unit to record the thermal loading state of heat storage unit 7 on one hand and the current process parameters in unloading unit 19 on the other. The control unit thus guarantees that, for example when unloading is to take place, heat from heat storage unit 7 is supplied via pipe 23 to unloading unit 19. In the event that a heat requirement exists for unloading, and a thermal loading state would not be sufficient in heat storage unit 7, further thermal loading can also be initiated through control unit 29, wherein for example power generation unit 2 enables electric power via power cable 8 for electric heating of the heat carrier in heat generation unit 4. To do this, control unit 29 also has a bidirectional signal link with heat generation unit 4 and with power generation unit 2.

The method according to the invention for storing energy is described in more detail below on the basis of the functioning of system 1. The sun as a renewable energy source 3 emits solar radiation, which can be used as an energy effect 5 through a photovoltaic system as power generation unit 2 for generating power. At the same time, the solar radiation as energy effect 5 can also be used to heat a, in particular liquid, heat carrier in heat generation unit 4. If energy effect 5 due to solar radiation would not be sufficient or would not lead to any desired heating of the heat carrier in the time scheduled for this, electric power can additionally be supplied via power cable 8 from power generation unit 2 to heat generation unit 4. Heating the heat carrier, which is also described as thermal loading, therefore takes place due to energy effect 5 through renewable energy and/or electric power that has been generated in particular from renewable energy.

The heated heat carrier is conveyed via line 6, which is in particular a pipe, to heat storage unit 7, where it is stored. The electric power generated in power generation unit 2 is supplied via power cable 9 to hydrogen production unit 10. Water from water store 12 is furthermore supplied via pipe 11 to hydrogen production unit 10. The water in hydrogen production unit 10 is separated by electrolysis into hydrogen and oxygen. The oxygen is supplied via pipe 16 to oxygen consumer 17. The hydrogen is supplied via pipe 13 to loading unit 14 of the hydrogen storage device 15. Unloaded carrier medium in loading unit 14 is provided in the form of dibenzyltoluene. Hydrogenation into perhydro-dibenzyltoluene takes place due to the supply of hydrogen. The carrier medium is now in a loaded state. The loaded carrier medium is conveyed from loading unit 14 via pipe 21 to carrier medium storage unit 18 and can be stored there if required. The loaded carrier medium is conveyed from carrier medium storage unit 18 via pipe 21 to unloading unit 19. Unloading of the perhydro-dibenzyltoluene takes place in unloading unit 19, wherein hydrogen is released from the carrier medium. Heat is needed to release the hydrogen, and is supplied to unloading unit 19 from heat storage unit 7 via pipe 23. The carrier medium unloaded in the unloading unit, which is available following dehydrogenation as dibenzyltoluene, is supplied via pipe 21 to carrier medium temporary storage unit 20. The carrier medium in the unloaded state in carrier medium temporary storage unit 20 is temporarily stored until a need for carrier medium exists in loading unit 14. The carrier medium is then conveyed from carrier medium temporary storage unit 20 via pipe 21 to loading unit 14.

The hydrogen released in unloading unit 19 is supplied to hydrogen oxidation unit 25 via pipe 24 and is combined with oxygen in a pure form or with atmospheric oxygen coming from oxygen source 26. This results in electric power, which is supplied via power cable 27 to power supply network 28. Water forms at the same time, and is discharged to a water store 30.

Figure 2:
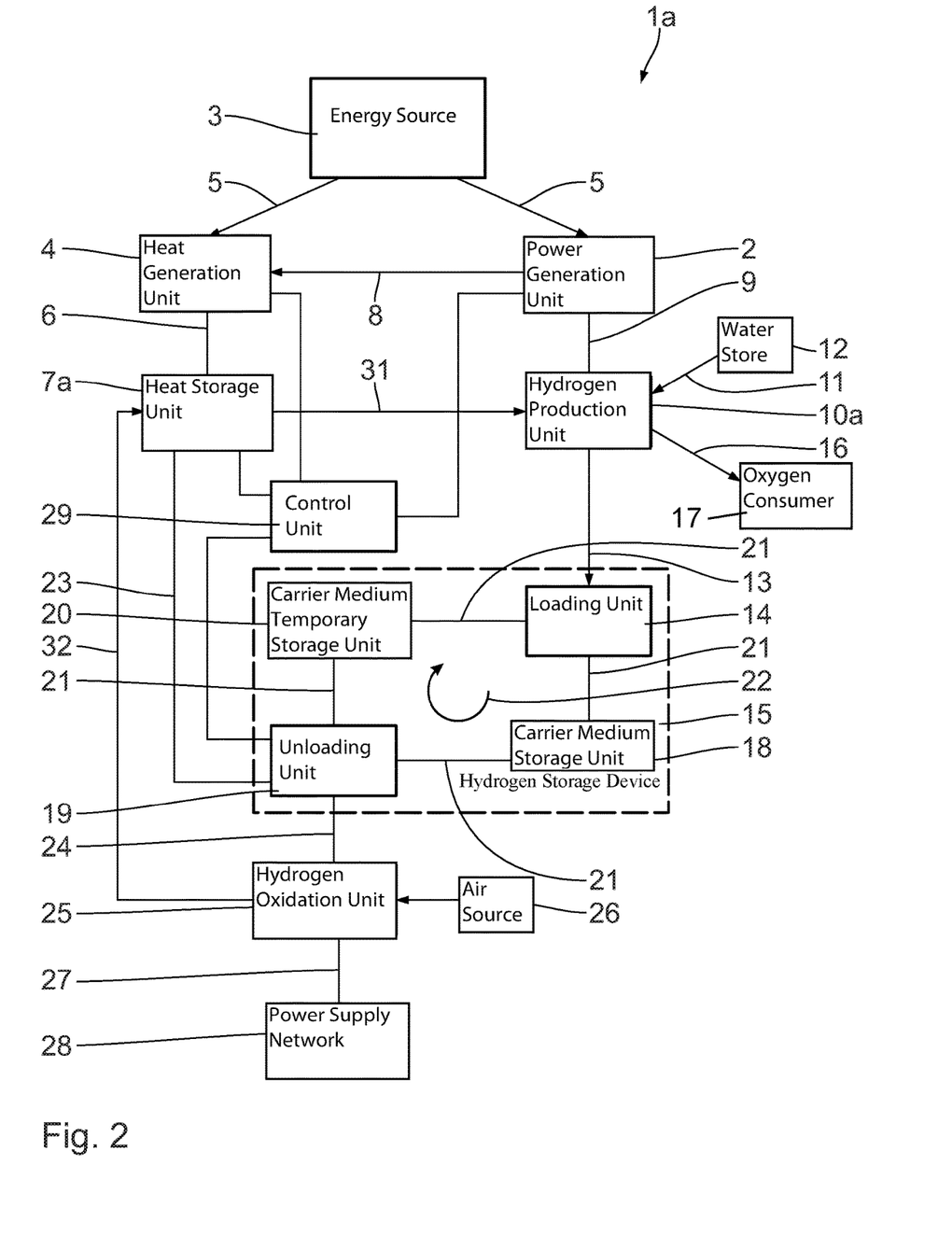
FIG. 2 is a schematic diagram corresponding to FIG. 1 of a system for storing energy in accordance with a second embodiment example.

A second embodiment example of the invention is described below with reference to FIG. 2. Constructively identical parts are given the same reference characters as for the first embodiment example, to whose description reference is hereby made. Constructively different, but functionally similar parts are given the same reference characters followed by an a.

System 1a corresponds essentially to system 1 according to the first embodiment example. The main difference is the design of hydrogen production unit 10a, which is a SOEC according to the embodiment example shown. The SOEC enables the electrolysis of water vapor, which is supplied from heat storage unit 7a via an additional pipe 31. The energy needed to produce hydrogen is reduced by the fact that water vapor is already supplied to the SOEC. In particular, electrical energy for evaporating the water is reduced or not needed at all. The use of heat storage unit 7a combined with SOEC 10a is therefore particularly advantageous. Heat storage unit 7a according to the second embodiment example is characterized in that water vapor is released during thermal loading. This already released water vapor can now be used directly for electrolysis in SOEC 10a. During thermal unloading of heat storage unit 7a, water vapor coming in particular directly from hydrogen oxidation unit 25 can be absorbed, with hydrogen oxidation unit 25 being connected directly to heat storage unit 7a via a further pipe 32. This means that heat storage unit 7a serves at the same time as a water storage unit.

The functioning of system 1a according to the second embodiment example corresponds to that of the first embodiment example. During an energy-rich period, an energy quantity of 10 kWh of electrical energy is supplied to SOEC 10a from power generation unit 2 via power cable 9. This energy quantity is used in SOEC 4 to produce hydrogen with an efficiency of 80%. This improved efficiency results from the use of water in the vapor state from heat storage unit 7a. The quantity of hydrogen produced is used in loading unit 14 to hydrogenate dibenzyltoluene to perhydro-dibenzyltoluene, whereby the hydrogenation efficiency is 98%. This means that from the original quantity of electrical energy used, a quantity of hydrogen in a storable, liquid state is bound in the hydrogen storage device, whereby this quantity corresponds to a heat energy of about 7.84 kWh. The heat from heat storage unit 7a is used to release all of the hydrogen in hydrogen storage device 15, so that the entire quantity of released gaseous hydrogen can be converted to heat energy amounting to 7.84 kWh. This hydrogen is streamed into hydrogen oxidation unit 25 in the form of the PEM fuel cell with an efficiency of 55%. This results in an electrical energy quantity of 4.31 kWh. The power-to-power efficiency therefore amounts to 43.1%. Compared with a comparison arrangement with a power-to-power efficiency of 25%, system 1a according to the invention has a power-to-power efficiency increase of about 73%.

Figure 3:
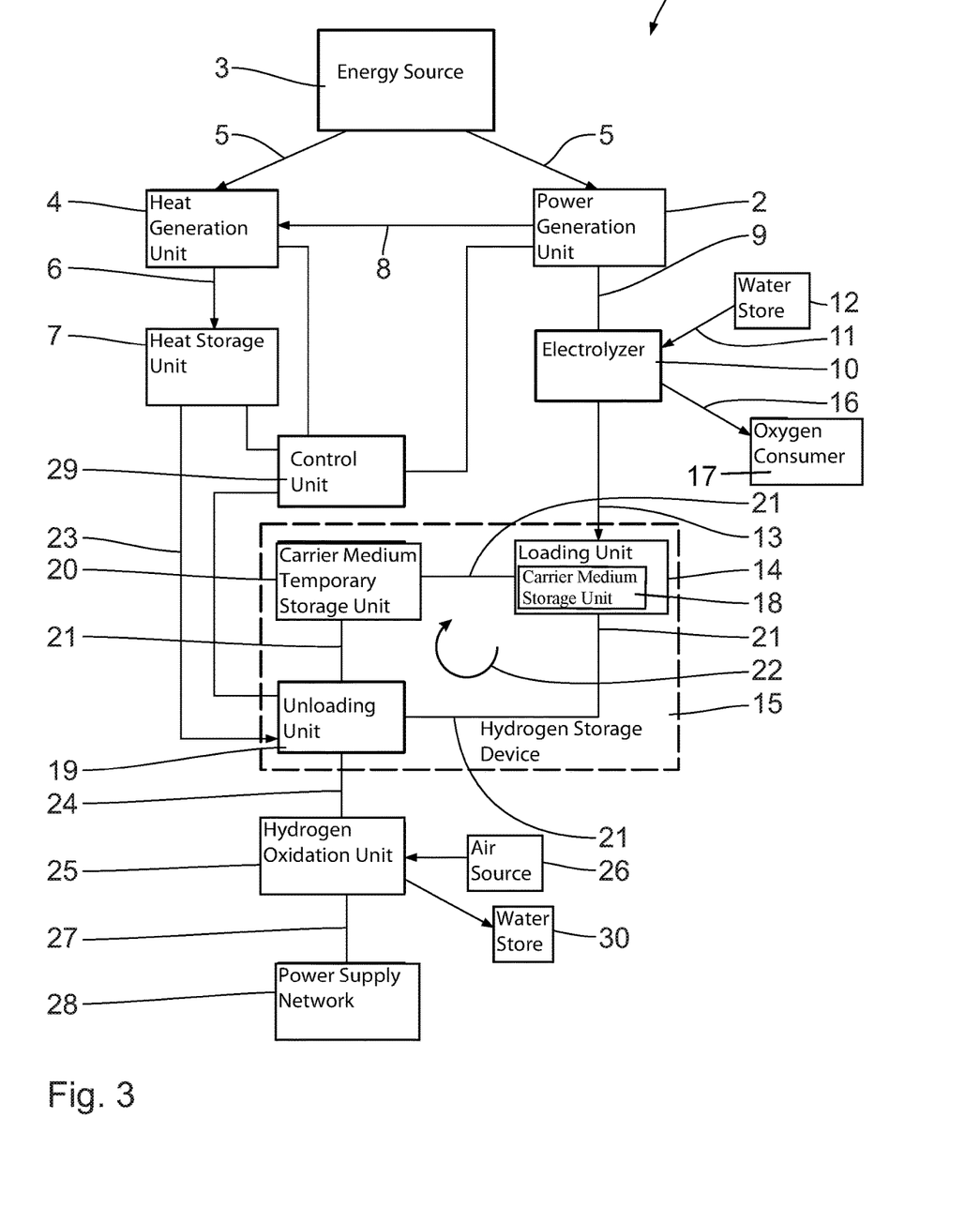
FIG. 3 is a schematic diagram corresponding to FIG. 1 of a system for storing energy in accordance with a third embodiment example.

FIG. 3 shows the carrier medium storage unit 18 is built into the loading unit 14.

While specific embodiments of the invention have been shown and described in detail to illustrate the application of the principles of the invention, it will be understood that the invention may be embodied otherwise without departing from such principles.

The invention claimed is:

1. A system for releasing energy in a form of hydrogen comprising:
   an unloading unit for unloading hydrogen from a loaded carrier medium;
   a heat generation unit for generating heat;
   a heat storage unit for storing the heat generated by means of the heat generation unit, wherein the heat storage unit is connected with the unloading unit in order to supply heat;
   a power generation unit for generating electric power, wherein the power generation unit is connected with the heat generation unit in order to supply electric power for heat generation, wherein the heat from the heat storage unit is delivered directly to the unloading unit.

2. The system according to claim 1, wherein the power generation unit is connected with a hydrogen production unit in order to supply electric power for hydrogen production, wherein the power generation unit enables the generation of power from renewable energy sources, wherein the electric power is delivered from the power generation unit directly to the heat generation unit.

3. The system according to claim 1, further comprising:
a hydrogen oxidation unit for generating electric power, wherein the hydrogen oxidation unit is connected with a power supply network for delivering the electric power.

4. The system according to claim 1, wherein the unloading unit for conveying unloaded carrier medium is connected with a loading unit, wherein a carrier medium temporary storage unit for storing the unloaded carrier medium is placed between the unloading unit and the loading unit and a carrier medium storage unit for storing the loaded carrier medium is placed between the loading unit and the unloading unit.

5. The system according to claim 1, further comprising:
a hydrogen production unit for producing hydrogen.

6. The system according to claim 1, wherein the hydrogen is bound with the carrier medium in the loading unit.

7. The system according to claim 1, wherein the carrier medium storage unit is built into the loading unit.

8. The system according to claim 1, wherein the carrier medium storage unit is a tank and the carrier medium storage unit has at least one tank pipe for connection to an external pipeline system.

9. A system for releasing energy in a form of hydrogen comprising:
an unloading unit for unloading hydrogen from a loaded carrier medium;
a heat generation unit for generating heat;
a heat storage unit for storing the heat generated by means of the heat generation unit, wherein the heat storage unit is connected with the unloading unit in order to supply heat;
a power generation unit for generating electric power, wherein the power generation unit is connected with the heat generation unit in order to supply electric power for heat generation; and
a control unit, which has a bidirectional signal link with the heat generating unit and the unloading unit.

10. The system according to claim 1, wherein the power generation unit is at least one of a photovoltaic unit, a wind farm and a hydroelectric power station.

11. The system according to claim 1, wherein the hydrogen production unit is a solid oxide electrolysis cell, wherein the solid oxide electrolysis cell is connected with the heat storage unit in order to absorb water vapor.

12. The system according to claim 1, wherein the hydrogen is chemically bound with the carrier medium in the loading unit.

13. The system according to claim 5, wherein the hydrogen production unit is an electrolyzer.

14. The system according to claim 5, further comprising:
a loading unit for loading the carrier medium with the hydrogen produced in the hydrogen production unit.

15. The system according to claim 1, wherein the hydrogen is bound by physisorption with the carrier medium in the loading unit.

16. A system for releasing energy in a form of hydrogen, the system comprising:
an unloading unit for unloading hydrogen from a loaded carrier medium;
a heat generation unit for generating heat;
a heat storage unit for storing the heat generated by the heat generation unit, wherein the heat storage unit is connected with the unloading unit in order to supply heat; and
a control unit comprising a bidirectional signal link with the heat generation unit and the unloading unit.

* * * * *